US006615191B1

(12) United States Patent
Seeley (10) Patent No.: US 6,615,191 B1
(45) Date of Patent: Sep. 2, 2003

(54) SOFTWARE LICENSING AND DISTRIBUTION SYSTEMS AND METHODS EMPLOYING BIOMETRIC SAMPLE AUTHENTICATION

(76) Inventor: E. Addison Seeley, 31 Warren Ave., Weston, MA (US) 02193

(*) Notice: Subject to any disclaimer, the term of this patent is extended or adjusted under 35 U.S.C. 154(b) by 0 days.

(21) Appl. No.: 09/349,217

(22) Filed: Jul. 6, 1999

Related U.S. Application Data
(60) Provisional application No. 60/133,445, filed on May 11, 1999.

(51) Int. Cl.$^7$ ................................................ G06F 17/60
(52) U.S. Cl. ...................... 705/54; 713/201; 713/202; 705/39; 705/41
(58) Field of Search ......................... 705/39, 41, 54; 713/201, 202

(56) References Cited

U.S. PATENT DOCUMENTS

| | | | | |
|---|---|---|---|---|
| 5,191,611 A | * | 3/1993 | Lang ........................... 380/25 |
| 5,636,276 A | | 6/1997 | Brugger ........................ 380/4 |
| 5,684,963 A | | 11/1997 | Clement ..................... 395/226 |
| 5,768,382 A | | 6/1998 | Schneier et al. ............. 380/23 |
| 5,838,812 A | * | 11/1998 | Pare, Jr. et al. ............. 382/115 |
| 5,842,023 A | | 11/1998 | Tsumura ..................... 395/712 |
| 5,856,659 A | | 1/1999 | Drupsteen et al. .......... 235/380 |
| 5,869,822 A | * | 2/1999 | Meadows, II et al. ....... 235/380 |
| 5,878,155 A | | 3/1999 | Heeter ........................ 382/115 |
| 5,930,804 A | * | 7/1999 | Yu et al. ..................... 707/104 |
| 5,933,498 A | * | 8/1999 | Schneck et al. .............. 380/4 |
| 6,012,049 A | * | 1/2000 | Kawan ........................ 705/41 |
| 6,035,403 A | * | 3/2000 | Subbiah et al. ............. 713/201 |
| 6,045,039 A | * | 4/2000 | Stinson et al. .............. 235/379 |

FOREIGN PATENT DOCUMENTS

| | | |
|---|---|---|
| WO | WO 98/11478 A2 | 3/1998 |
| WO | WO009931621 A1 * | 6/1999 ............ G06K/9/00 |

OTHER PUBLICATIONS

"Faults & Failures: Pentium serial number pains privacy groups," Linda Geppert, IEEE Spectrum, Jun. 1999.
"Web Systems' EMBASSY and NEC's PID Software to be integrated into Pollex Fingerprint ID System", Wave Systems Corp Web Site, http://www.wave.com/news/press_archive/990107Nec.html, Mar. 3, 2000.
Harowitz, Sherry L; More than meets the eye; Security Management; vol. 37, Iss 2 Arlington; Feb. 1993.*
Iris Imaging for Access; Sensar Sparks a Comeback; Advanced Imaging, v 13, n 4, p 22.*
NRI Demonstrates Low–Cost, easy–to–Integrate, Biometric personal Identification at Cardtech/Securtech '96; PR Newswire, May 9, 1996.*
Murphy, Joan H.; Is Business Embracing Biometrics; Security Management, Arlington;Sep. 1991; vol. 35, Iss. 9 p. 37, 3 pages.*

* cited by examiner

*Primary Examiner*—Vincent Millin
*Assistant Examiner*—Jagdish N Patel
(74) *Attorney, Agent, or Firm*—Kristofer E. Elbing (57) ABSTRACT

Software validation and distribution methods and apparatus are disclosed. These can include storing biometric identification information received from a customer in a customer storage area, receiving a biometric identification signal in response to customer interaction with a biometric interface, and detecting a match between the biometric identification signal and the identification information stored in the customer storage area. The customer can then be permitted to use the software.

56 Claims, 9 Drawing Sheets

SOFTWARE LICENSING AND DISTRIBUTION SYSTEMS AND METHODS EMPLOYING BIOMETRIC SAMPLE AUTHENTICATION

CROSS-REFERENCE TO RELATED APPLICATION

This patent application claims the benefit under 35 U.S.C. §119 (e) of United States Provisional Patent Application entitled System and Method of Enforcing Intellectual Property Laws Governing Software Use which was filed on May 11, 1999 and received Ser. No. 60/133,445, and which is herein incorporated by reference.

FIELD OF THE INVENTION

This application relates generally to software licensing and distribution systems and methods that employ biometric sample authentication.

BACKGROUND OF THE INVENTION

Piracy currently exacts an immense toll on the revenues of software publishers. The Business Software Alliance (BSA) and the Software Publishers Association (SPA) estimate that revenue losses to the worldwide computer software industry due to piracy amounted to $11.4 billion in 1997, with as many as four in every ten business software applications being pirated. The entertainment software industry is also heavily burdened, with foreign counterfeit markets for video games estimated to range as high as 93%, according to the Douglas Consulting Group. The music industry is similarly affected, with as many as one in three copies produced globally being pirated.

These levels of piracy continue to take their toll despite enforcement actions and technical countermeasures. While particular enforcement actions have successfully stopped individual counterfeiting operations, they have failed to entirely deter others from taking their places. And while various technical piracy countermeasures, such as copy protection and mandated registration, have been proposed and deployed, none of these has been widely successful in ensuring that manufactures of mass-market software do not suffer substantial lost revenue from piracy.

SUMMARY OF THE INVENTION

In one general aspect, the invention features a software distribution method that includes offering software to a customer and storing biometric identification information received from the customer in a customer storage area. A biometric identification signal is received in response to customer interaction with a biometric interface, a match is detected between the biometric identification signal and the identification information stored in the customer storage area by the step of storing, and the customer is permitted to use the software in response to the step of detecting a match, after the step of offering.

In preferred embodiments, the method can further include receiving a payment commitment from the customer before the step of permitting the customer to use the software. The method can include presenting a selection of payment choices including at least one choice involving access based on biometric identification and at least one choice involving access without biometric identification, with the step of receiving a payment commitment being performed after the step of presenting the selection. The customer identification information can be received electronically through a public network and the step of receiving a payment commitment can also be conducted electronically through a public network. The biometric identification information can be stored in a portable machine-readable storage element, which can have a size on the order of a credit-card or smaller. A copy of the software can be conveyed to the user. The method can further include the steps of recording the software in a proprietary format and conveying to the customer a proprietary player capable of reading the proprietary format. The method can further include the steps of detecting a mismatch between the biometric identification signal and the identification information stored in the customer storage area, and permitting the customer to use the software a limited number of times in response to detecting a mismatch and after the step of offering. The step of permitting the customer to use the software a limited number of times may require a password from the customer. The method can further include the steps of storing replacement biometric identification information received from the customer in a customer storage area, receiving a biometric identification signal in response to customer interaction with a biometric interface, detecting a match between the biometric identification signal and the replacement identification information stored in the customer storage area by the step of storing, and permitting the customer to use the software in response to the step of detecting a match between the biometric identification signal and the replacement identification information. A biometric interface can be registered to validate the received biometric identification signal. The biometric identification information received from the customer can be stored in one of a plurality of customer storage entries in a centralized customer database. The step of offering can offer software for playing audio recordings. The step of offering can offer software for playing video recordings.

In another general aspect, the invention features a software distribution system that includes means for offering software to a customer, storage means for storing biometric identification information received from the customer in a customer storage area, and biometric sensing means. The system also includes means for detecting a match between a biometric identification signal from the biometric sensing means and the identification information stored in the customer storage area, and means for permitting the customer to use the software in response to a match signal from the means for detecting a match.

In a further general aspect, the invention features a licensed software use validation method that includes presenting a biometric interface to a customer, receiving a biometric identification signal in response to customer interaction with the biometric interface, detecting a match between the biometric identification signal and an entry in a customer storage area, which entry indicates that the customer is registered to access the software, and permitting the customer to use the software in response to the step of detecting a match.

In preferred embodiments, the steps of presenting, receiving, detecting, and permitting can be performed by a player with the steps of presenting, receiving, detecting, and permitting taking place after the player and rights in the software have been conveyed to the customer.

In another general aspect, the invention features a software player assembly for playing software for licensed customers that includes a biometric information storage area for storing an entry in a customer storage area, which entry indicates that a customer is registered to access the software, a biometric sensor having a data output, a match detector responsive to the biometric sensor and to the biometric information storage area and having a match signal output, and storage for the software having an access gate that has an enable signal input responsive to the match detector.

In preferred embodiments, the biometric information storage area, the biometric sensor, the match detector, and the storage for the software can all be housed in a single housing. The player assembly can weigh less than three pounds. The biometric sensor can be a fingerprint detector. The player assembly can be an audio recording player assembly. The player assembly can be a video recording player assembly.

In a further general aspect, the invention features a software player for playing software for licensed customers, which includes means for presenting a biometric interface to a customer, means for receiving a biometric identification signal in response to customer interaction with the biometric interface, means for detecting a match between the biometric identification signal and an entry in a customer storage area, which entry indicates that the customer is registered to access the software, and means for permitting the customer to use the software in response to detection of a match by the means for detecting a match.

In another general aspect, the invention features a software distribution system that includes an offer interface for offering software to a customer, an identification interface for receiving biometric information from a customer, and means for storing biometric identification information received from the customer in a customer storage area. In preferred embodiments, the identification interface can be operative to read the biometric information from a portable storage element. The system can further include means for receiving payment from the customer.

In a further general aspect, the invention features a transportable data memory that includes at least one software module operative to run on a player operated by a customer, and a biometric access restriction module operative to restrict access to the software module by the player based on a biometric characteristic of the customer. In preferred embodiments, the data memory can further include a biometric registration module operative to receive and store the biometric characteristic used by the biometric access restriction module.

Systems according to the invention may be advantageous in that they can assist software publishers in protecting their intellectual property rights. By providing systems and methods capable of verifying customer identity instead of verifying possession of proprietary objects and information, software publishers are less vulnerable to the duplication of such objects and information. A well-designed system according to the invention can therefore reduce the number of violations of a publisher's intellectual property rights.

Deploying systems according to the invention can also help to reduce the ordinary customer's temptation to copy software. Because a customer cannot make a copy of a software title that does not require his or her physiology to operate without specialized hardware, extensive cracking, and/or reverse-engineering, most customers will simply refrain from making unlicensed copies of software. Nor are a large number of ordinary customers likely to purchase black market unlicensed proprietary readers to bypass biometric access systems.

Systems according to the invention can make commercial-scale counterfeiting more difficult as well. To produce counterfeit copies, the counterfeiter must first bypass the biometric access system to extract a master copy. And even if the counterfeiter can make useable copies of this master, it will be dangerous and time-consuming for him or her to establish his or her own biometric registration system, and he or she will therefore be more likely to sell copies without biometric access methods. Such copies will be easily distinguishable from authorized copies and therefore harder to sell.

Software publishers who use systems according to the invention may also be able to employ business models that would otherwise be unworkable. Computer software is typically not rented, for example, because of the high risk of piracy. With this risk reduced, however, software publishers may be able to service a market need that could not be satisfied before.

In addition, systems according to the invention may provide their customers with some welcome access control that is easy-to-use and firmly enforced, without requiring them to purchase a separate, dedicated access control system. A web browser that employs biometric authentication, for example, cannot be used by children to access potentially harmful information on the internet. And an accounting system that requires an accountant's thumbprint to be accessed will be resistant to casual browsing by coworkers.

DESCRIPTION OF AN ILLUSTRATIVE EMBODIMENTS

This application relates generally to software licensing and distribution systems and methods that employ biometric sample authentication. These include systems and methods that are based on a correlative comparison of a unique biometric sample gathered directly from the customer with an authenticated biometric sample of the same type obtained and stored previously.

For the purposes of this application, software is defined as a work of authorship that includes a set of instructions for a player. These instructions can instruct a digital or analog player to perform one or more of a number of different types of operations, such as solving calculations, playing music, displaying pictures and/or playing video material. Software can be stored in a number of newer analog and digital formats such as semiconductor memory, floppy disks, or CD's, or in older analog and digital formats such as magnetic tape, vinyl impressions, or punch cards.

Biometrics is the science of identifying people based on their unique physiological characteristics, such as fingerprints, facial features, voice characteristics, iris features, hand shapes, DNA characteristics, handwritten signature features, or typing patterns. For the purposes of this application, a biometric, a biometric sample, or biometric information are all defined as identification information acquired directly or indirectly from a physiological characteristic of an individual.

Distribution and licensing, as used in this application, are intended to cover acts in furtherance of the commercial exploitation of rights in software. Although such acts are commercial, they need not be directly revenue-producing, such as in the case of software that is freely distributed with embedded advertising features or as free trial versions intended to lead customers to purchase full-featured versions of the same software. Acts of distribution and licensing may also follow the stream of commerce without being part of a for-profit venture. For example, an organization may wish to freely distribute software that was developed at considerable expense without releasing its intellectual property rights in the software. Such acts are to be distinguished from access control, which is generally employed to safeguard an individual or organization's secrets in settings that are not intended to place them in the stream of commerce.

Figure 1:
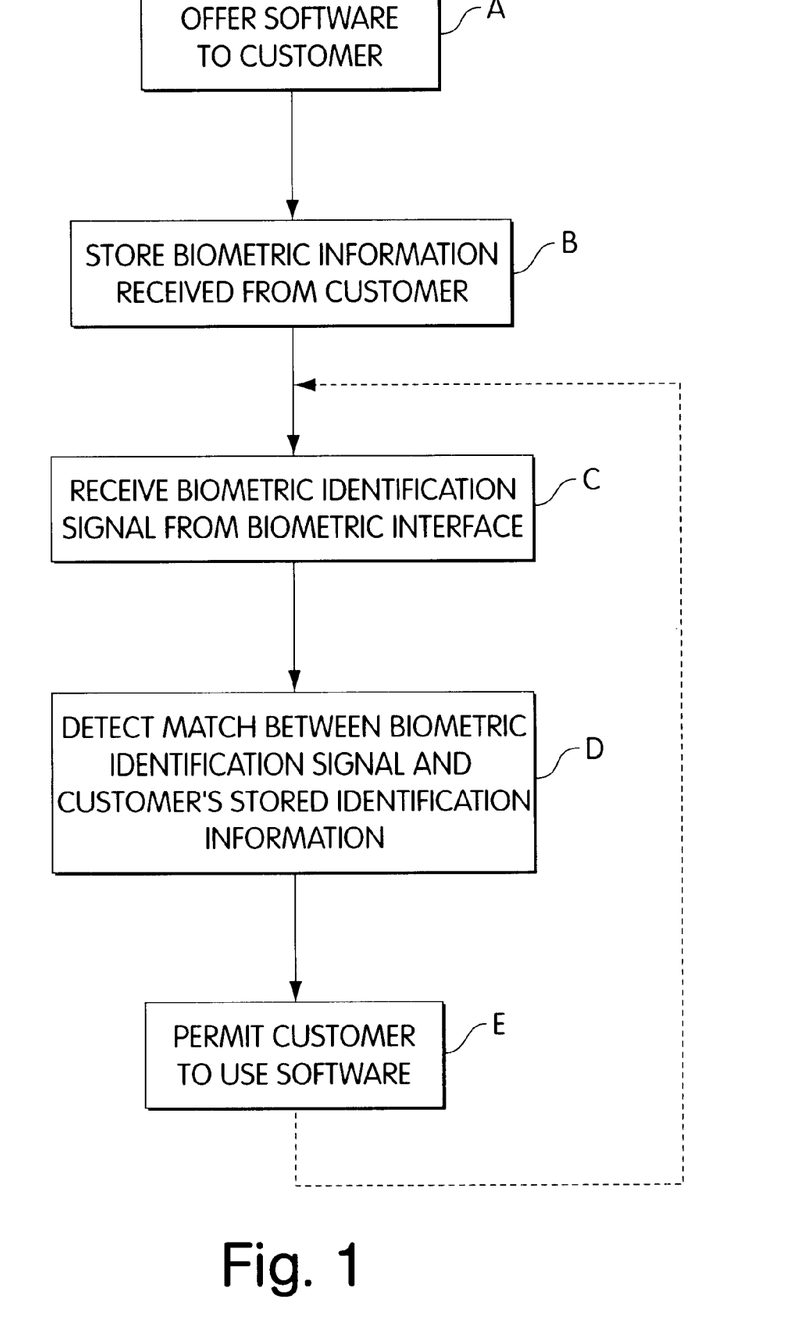
FIG. 1 is a flowchart illustrating an overview of methods according to the invention.

FIG. 1 is a flowchart illustrating an overview of methods according to the invention that can be used in connection with the licensing and distribution of software. An offering entity, such as a software publisher, music publisher or retailer, can begin by making an offer of a software product to a customer (step A). This can be an offer for the customer to rent, purchase, license, or otherwise enjoy rights in a copy of one or more software titles for a limited or unlimited period. The offer can be communicated to the customer in a number of different ways, such as by an electronic communication of the availability of the product to one or more customers, or by placement of a physical or electronic version of the product in the stream of commerce.

The offer can be a compound offer that allows the user to chose between a software version that employs access based on biometric identification and one that does not. The biometric version may be priced more attractively, and/or it may have a different set of features. Because the biometric version is less likely to be pirated, it can be sold less expensively, while allowing the offering entity to maintain its profit margins.

Biometric information may be received from the customer and stored (step B). This step can be performed before the offer is made, such as in the case of an existing customer, or it can be performed after the offer has been made, such as where the customer to which the offer is made is a prospect rather than an existing customer. The received biometric information can be any type of biometric information, and can be derived directly from the customer (e.g., by scanning his or her retina) or obtained in an encoded format from a prior derivation (e.g., from a "smart card" or other storage device). The received biometric information can be stored in any location from which it can be later retrieved, tested, or otherwise accessed. For example, it may be stored locally on the media that carries the software, it may be stored in a central database or part of a network of connected databases, or it may be stored on a server maintained by another organization.

When the customer wishes to use the software, he or she presents a portion of his or her physiology to a biometric sensor, which derives a biometric identification signal (step C). If a match is detected between the biometric identification signal and the biometric identification information stored for the customer (step D), the customer is permitted to use the software (step E). The matching step is typically a correlative matching step that does not need to be an exact comparison, and can be performed by local hardware and/or software or by remote hardware and/or software via a network.

The permission step can allow the customer access to the software in a number of ways. For example, it can operate by retrieving the software through a network once the match is detected, it can enable access to a local medium once the match is detected, or it can use a code derived from the biometric information to decode an encrypted version of the software.

Figure 2:
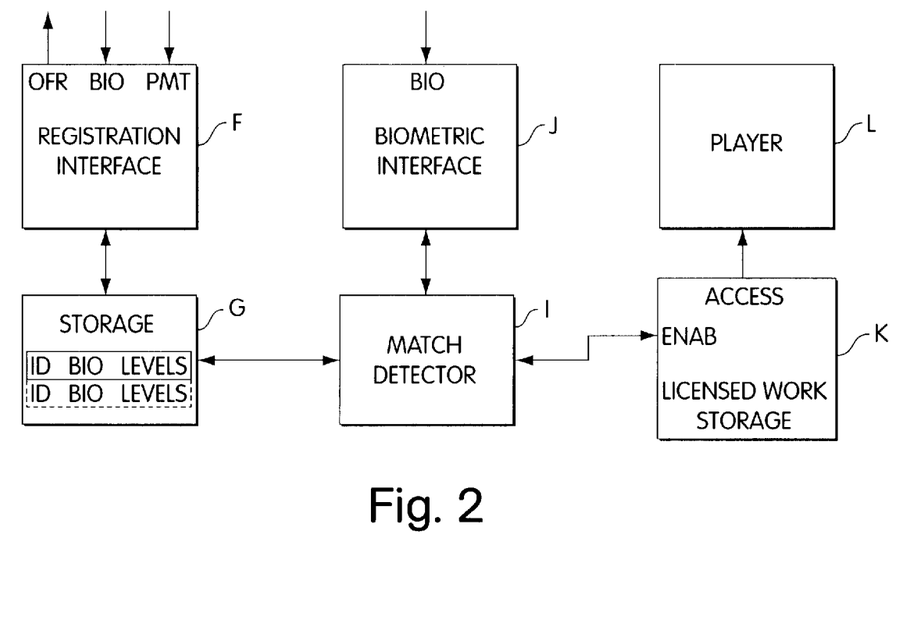
FIG. 2 is a block diagram presenting an illustrative breakdown of systems that are capable of carrying out the methods illustrated in FIG. 1.
Figure 3:
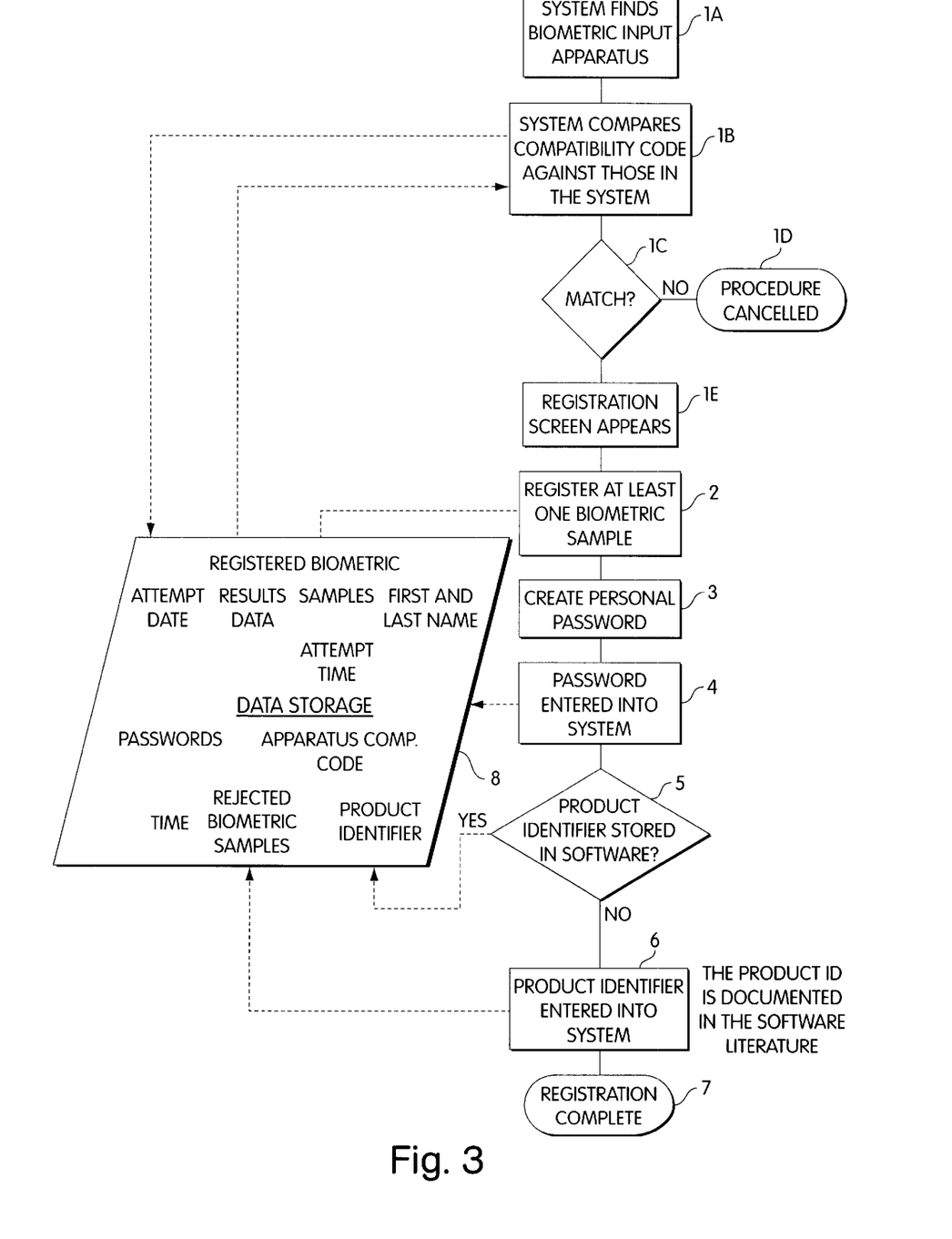
FIG. 3 is a flow chart representing a successful first attempt of a customer registration process for an embodiment of the invention in a non-networking environment.

FIG. 2 is a block diagram illustrating systems that are capable of carrying out the methods illustrated in FIG. 1. Such systems can include a registration interface F that has an offer output, a biometric input, and a payment input. The registration interface can take a number of forms. For example, it can be implemented using scripting language to be read by a web browser, it can be implemented in a self-serve vending machine operated by the customer, it can be part of a home software playing system, or it can be implemented in a terminal operated by sales personnel dispensing controlled stock. Like the other elements of the system, the functions of the registration interface can be implemented by different physical elements that can be operated by different organizations. For example, the offer output can be provided through an electronic network or by conveying an unsolicited written offer, with the biometric and payment inputs being implemented respectively as a biometric sensor and a credit card reader of a vending machine or a terminal at a retail outlet.

The registration interface can be operatively connected to biometric information storage G that includes one or more biometric information storage areas $H_1, H_2, \ldots, (H_N)$. The biometric information storage can take a number of different forms and can be located in a variety of places. For example, it can be located on the medium used to store the software, it can be located within a player assembly used to play the software, or it can be located at a central registration facility. The storage can include a single area for a single customer, or it can include multiple areas for multiple customers. The storage can also store additional information about the customer or customer, such as biographical information (e.g., name address, telephone number, e-mail address), licensed software title information, or access level infromation. The storage can be implemented using any of a variety of storage technologies, such as random access memory (RAM), electrically eraseable read-only memory (EEROM), or magnetic and/or optical storage disks.

In one embodiment, the biometric information storage is included in a portable machine-readable token, allowing biometric information to be accessed from different locations without re-acquiring it from the user's physiology at those locations. Such tokens can take a variety of forms, such as a magnetic stripe on a wallet-sized card, a bar code, a semiconductor chip, or a diskette. A so-called smart card is presently contemplated as a suitable portable token. Such cards are machine-readable, wallet-sized cards that generally include semiconductor memory having a larger capacity than a magnetic stripe (e.g., 1 K bytes or more instead of on the order of 0.2 K bytes). Smart cards can be readable through contacts or wireless methods, may be rewriteable, and/or include processing capabilities. Such cards can contain biometric information for more than one individual, such as a family or group of employees.

The biometric information storage can be operatively connected to a match detector I. The match detector is typically an automated correlative biometric match detector, which can detect stored and received biometric information. It is contemplated that different levels of accuracy and security may be appropriate for different applications of the method. In the distribution of mass-market software, for example, accuracy standards may be substantially relaxed as compared to biometric matching systems used for security purposes, as an occasional access by an unauthorized customer may be more tolerable than an accidental lockout of an authorized customer. It may also be desirable to use highly accurate biometric interfaces to acquire a stored biometric, and to thereafter use a less expensive interface on the player to authenticate the biometric information before playing back the software.

The match detector I can be operatively connected to a biometric interface J, which has a biometric information input. This biometric interface can include any type of biometric sensor, such as a fingerprint scanner, a retinal scanner, or a voice analyzer. The biometric sensor acquires biometric information and converts it to a form suitable for use by the match detector. Biometric sensors with bundled matching systems are available commercially from a number of vendors, such as Identicator Technology of San Bruno, Calif. and Biometric Identification, Inc., of Sherman Oaks, Calif. It is contemplated that the biometric interface will include an automatic configuration mechanism allowing other parts of the system to identify one of several approved biometric interfaces of different types, such as biometric interfaces for different types of biometric information or biometric interfaces from different manufacturers.

The match detector can also be operatively connected to an enable or gating input of work storage K. The work storage can take a number of different forms and can be located in a variety of places. For example, it can be located on a medium sold to and or otherwise conveyed to the customer, it can be located within a player assembly used to play the software (e.g., after downloading it from a central server into the player), or it can be located at a central facility and accessed through a public or private network. The storage can include a single area for a single customer, or it can include multiple areas for multiple customers. The storage can include one or more works, and the different works may be equipped with different access levels (e.g., feature-rich and economy versions). These different works or access levels can be registered for in advance, or they may be registered to a customer, and billed for, as he or she accesses them, once he or she has authenticated his or her identity using the biometric interface.

The work storage can have an output operatively connected to a player L. This player can be any player suitable for playing the accessed software. For example, it can be a single-user or multi-user computer system, a video game player, or a dedicated music or video player. The player is allowed to access and/or play the software under control of an enable input provided by the match detector. This enabling system can work in a number of different ways. For example, the work can be retrieved from storage when a match is detected, the work can be stored in an encrypted form and decrypted in response to the detection of a match, or the player can be activated in response to the detection of a match.

The work storage can be local to the customer and contain a copy of the software that has been conveyed to the customer, or it can be located at a remote facility, with the customer only being allowed temporary access to the software while the connection to the remote facility is active. In one embodiment, the customer receives a disk including a copy of the program and a restriction code identifying the customer, and before allowing access to the program, the player retrieves a biometric identifier from a central facility based on the restriction code. In another embodiment, the user obtains the software through a network connection (e.g. via the internet) in unregistered form and registers it locally.

The player can include a general-purpose media player or a proprietary media player and can be located in a larger player assembly. General purpose media players can read, and may also be able to write, information recorded in a standard format, and tend to be inexpensive. Information recorded on them can be easily copied, however, and systems that employ general-purpose players may therefore need to employ safeguards such as serial numbers and/or encryption to avoid copying. Proprietary players are players that employ a proprietary storage format and/or biometric access format, and their media cannot be read by general-purpose players or unlicensed special-purpose players. Players can be made proprietary in different ways, such as because their architecture is legally protected (e.g., by patent law), because they are conveyed to the user under agreement that they remain sealed, and/or because they operate according to a non-public standard, which can be subject to change. Larger player assemblies can include the media player and biometric sensor and match detector in a single housing. Portable player assemblies can be implemented in a number of different forms having a number of primary functions, such as audio players, video players, or portable computers. Some portable player assemblies might be given away rather than sold, such as in exchange for a commitment to purchase a number of software titles in the future.

Systems according to the invention can embody different subsets of the elements shown in FIG. 2 in different combinations, and perform different subsets of the steps shown in FIG. 1 in different combinations. In one embodiment, for example, the registration interface may take the form of a vending machine, with the biometric and work storage included within a storage medium that is dispensed by the vending machine and playable on a separate player. In another embodiment, the registration interface, biometric interface, match detector, and player can all be located in a single machine such as a specially modified personal computer, with the biometric storage and licensed work storage being stored in a remote networked server.

The elements shown in the figures are intended as illustrative and their function and structure can be implemented and adjusted in a number of ways by one of ordinary skill in the art. For example, the elements can be built using dedicated hardware or special-purpose software running on a general-purpose processor. Connections between the elements can be intermittent (e.g., e-mail connections), and the method steps need not be performed exclusively by machinery. The function and structure of the elements can also be broken down in different ways than those shown in figures. For example, the biometric registration and payment operations performed by the registration interface may be carried out at different times by different sales terminals belonging to different organizations.

Biometric systems according to the invention may be equipped with override, reregistration, and/or trial use mechanisms. Override mechanisms can be provided to allow the customer to override the biometric access, such as in the case of an injured finger that is not recognized by the match detector. Re-registration mechanisms allow the customer to substitute new biometric identification information for the old information. In one embodiment, the override mechanism allows the customer a predetermined number of override-type accesses before he or she is locked out of the software. Legitimate customers can then re-register if necessary to continue using the software (e.g., after surgery). Trial use mechanisms allow the user to use an unregistered disk a certain number of times before requiring registration.

Particular illustrative embodiments will now be discussed in more detail in connection with FIGS. 3–7, which illustrate a few of many system implementation possibilities. The customer registration process in an illustrative non-network environment, such as a PC, stereo, or video-player, is displayed in FIG. 3. The system searches and finds a biometric input apparatus 1a and compares its compatibility code against those in the system 1b. If there is a match 1c, the system accepts the apparatus and registration may continue. If the system does not find a match, the system does not accept the apparatus and registration may not proceed 1d. When there is a match, a registration screen 1e requires a customer to enter some general information, such as name, date of birth, and the like. It then requests a customer to present at least one biometric, such as a fingerprint, for registration with the system 2. In addition to presenting the biometric, the customer documents the biometric type (e.g., finger as opposed to eye) as well as the biometrics geography (e.g., index finger of right hand). This becomes part of a customer record. The system stores this biometric record 8 and requests the customer to create 3 and enter 4 a password which is also stored in the system 8. A product identifier is stored in the system either by the identifier having already been embedded in the software 5, or by the customer manually 6 entering it. In an error-free process, this information is stored 8 and registration would then be complete 7.

Figure 4:
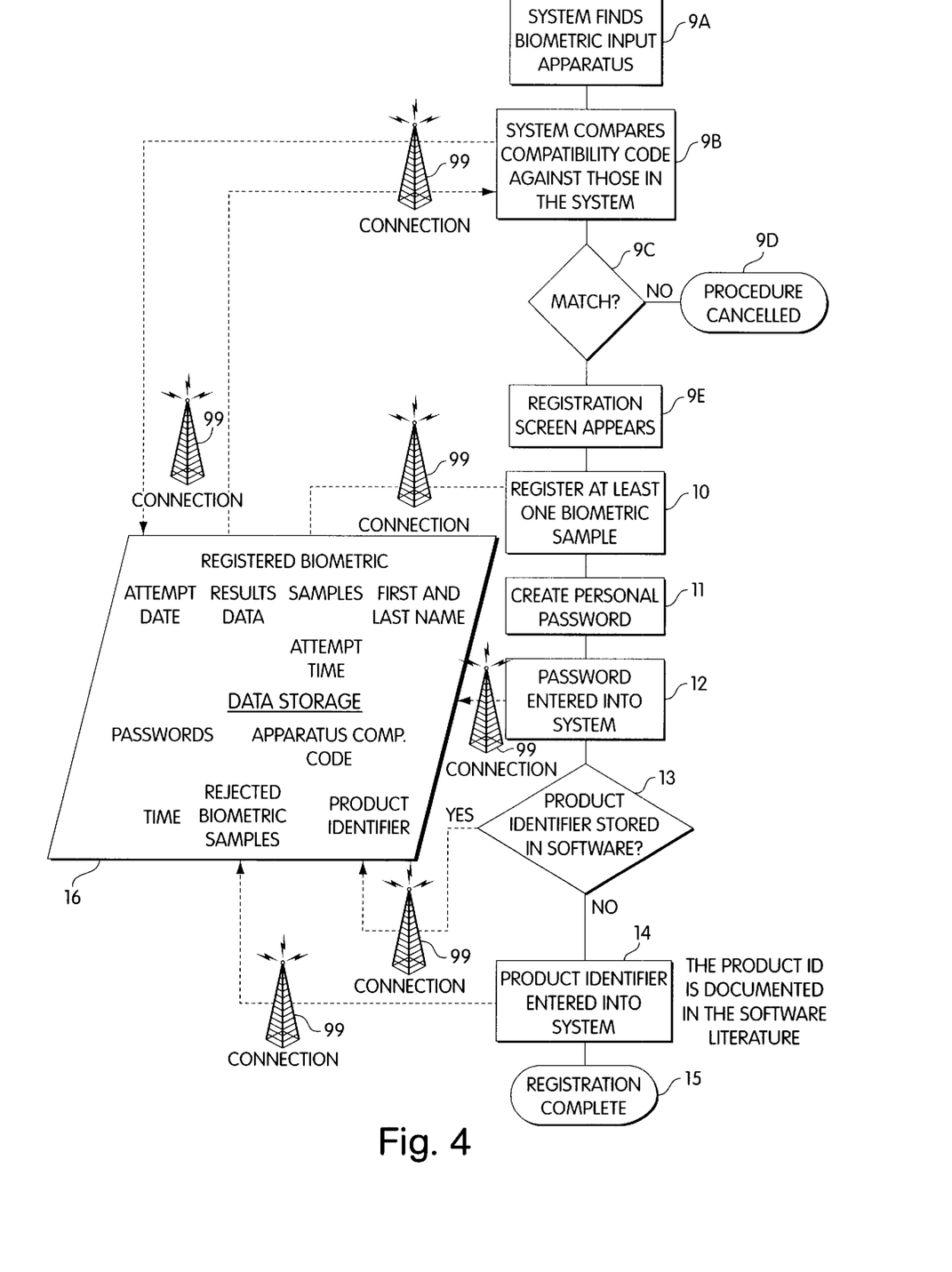
FIG. 4 is a flow chart illustrating a customer registration process for an embodiment of the invention in a networking environment.

The customer registration process in an illustrative network environment is displayed in FIG. 4. The system searches and finds a biometric input apparatus 9a and compares its compatibility code against the those in the system 9b. If there is a match 9c, the system accepts the apparatus and registration may continue. If the system does not find a match, the system does not accept the apparatus and registration may not proceed 9d. When there is a match, the software registration process in a network environment (e.g., using a LAN or the Internet) is the same as a non-network environment, except for operations involving the communication links. A registration screen 9E requires a customer to enter some general information, such as name, date of birth, and the like. It then requests a customer to present at least one biometric 10, such as a fingerprint, for registration with the system. In addition to presenting the biometric, the customer documents the biometric type (e.g., finger as opposed to eye) as well as the biometrics geography (e.g., index finger of right hand). This becomes part of the customer record. The system stores this biometric record 16 and requests the customer to choose 11 and enter 12 a password which is also stored in the system 16. A product identifier is stored in the system either by the identifier having already been embedded in the software 13, or by the customer manually 14 entering the identifier for storage 16 in the system. In an error free process, all information is stored 16 and registration would then be complete 15. Network communication of information can be through any linking method, such as the internet or by wireless communication 99.

Figure 5:
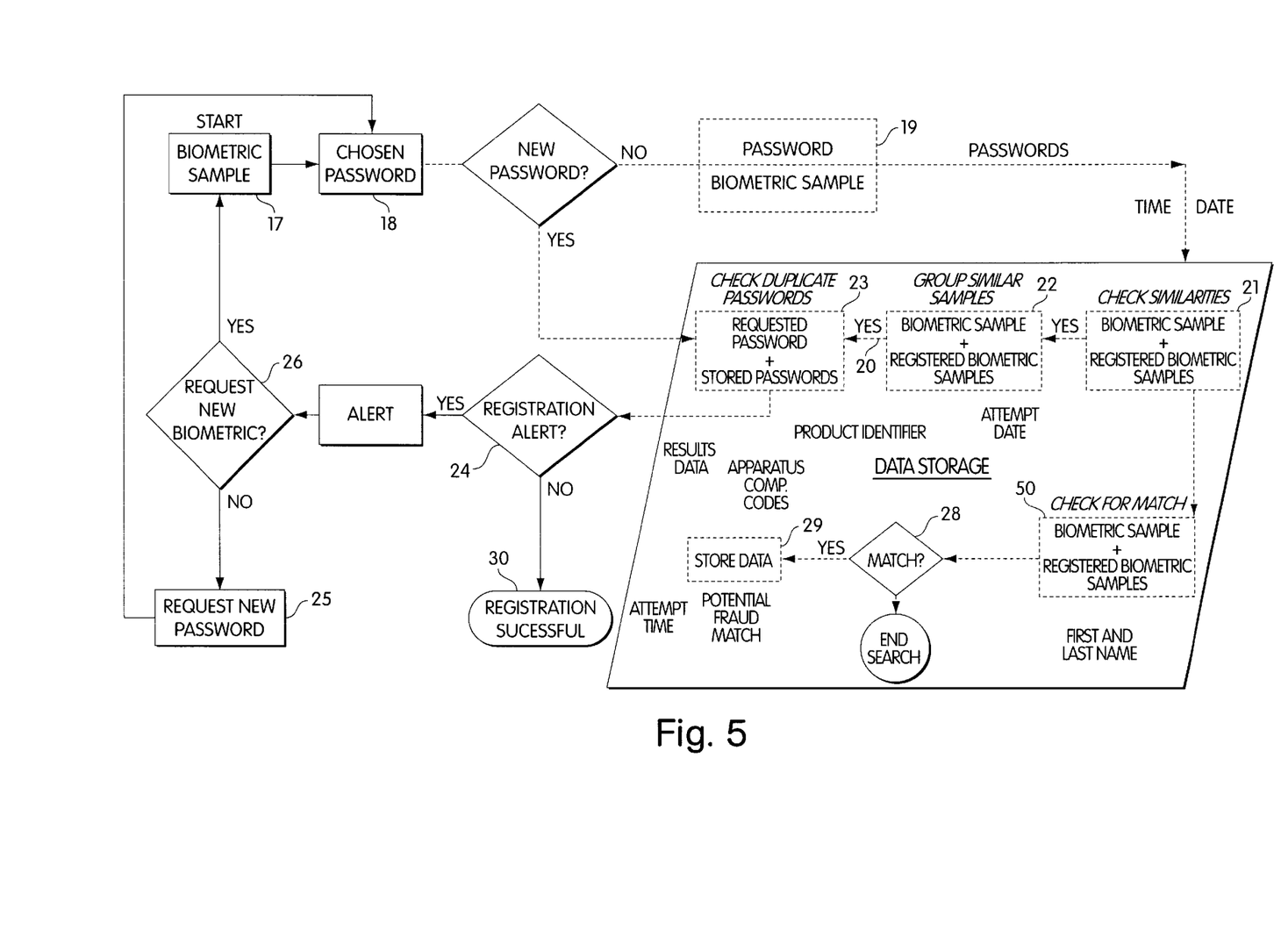
FIG. 5 is a flow chart illustrating biometric and password matching in a customer registration process for an embodiment of the invention.

FIG. 5 shows detail of biometric and password matching in an illustrative registration process. With the exception of the communication process (see 99 in FIG. 2), this process is the same for network and non-network environments. The system goes through the apparatus compatibility matching process (see FIG. 1, 1a–1d), and the biometric sample 17 and chosen password 18, are transmitted to the system. The system compares the biometric sample against those previously stored 21 (e.g., in the case of multiple customer licenses). Samples that are similar are identified 22. The sensitivity of what constitutes "similar" samples is an adjustable part of the system. The system then checks the passwords and/or user names to ensure there are no duplicates 23. If a duplicates exist, the system rejects them, displays a registration alert 24, and requests that the registering customer choose another password or user name 25. If the system defines a biometric sample as being too similar, the system requests that a different biometric sample be registered (e.g., a different finger) 26. The sensitivity of what defines a biometric sample as being too similar is an adjustable part of the system. If a new password and/or user name is requested, the customer enters a different password and/or user name 18 and the system compares it against those stored 23. If the system finds no duplicates, it accepts the information 30. If it finds a duplicate 20, the process continues until an original password and/or user name is chosen. The same process occurs with the biometric sample until the system defines that the sample is unique enough to be accepted 60. In an optional security feature, the system additionally compares the registered biometric sample with those previously rejected in past activation attempts by the system (to detect a potential prior fraud match) 50. If one is found 28, this information is stored in the system for reference 29. This feature of the system is configurable to suit the needs of the customer (e.g., allowing for administrative alerts, reporting, and the like). Registration is complete when all data is accepted 30.

Figure 6:
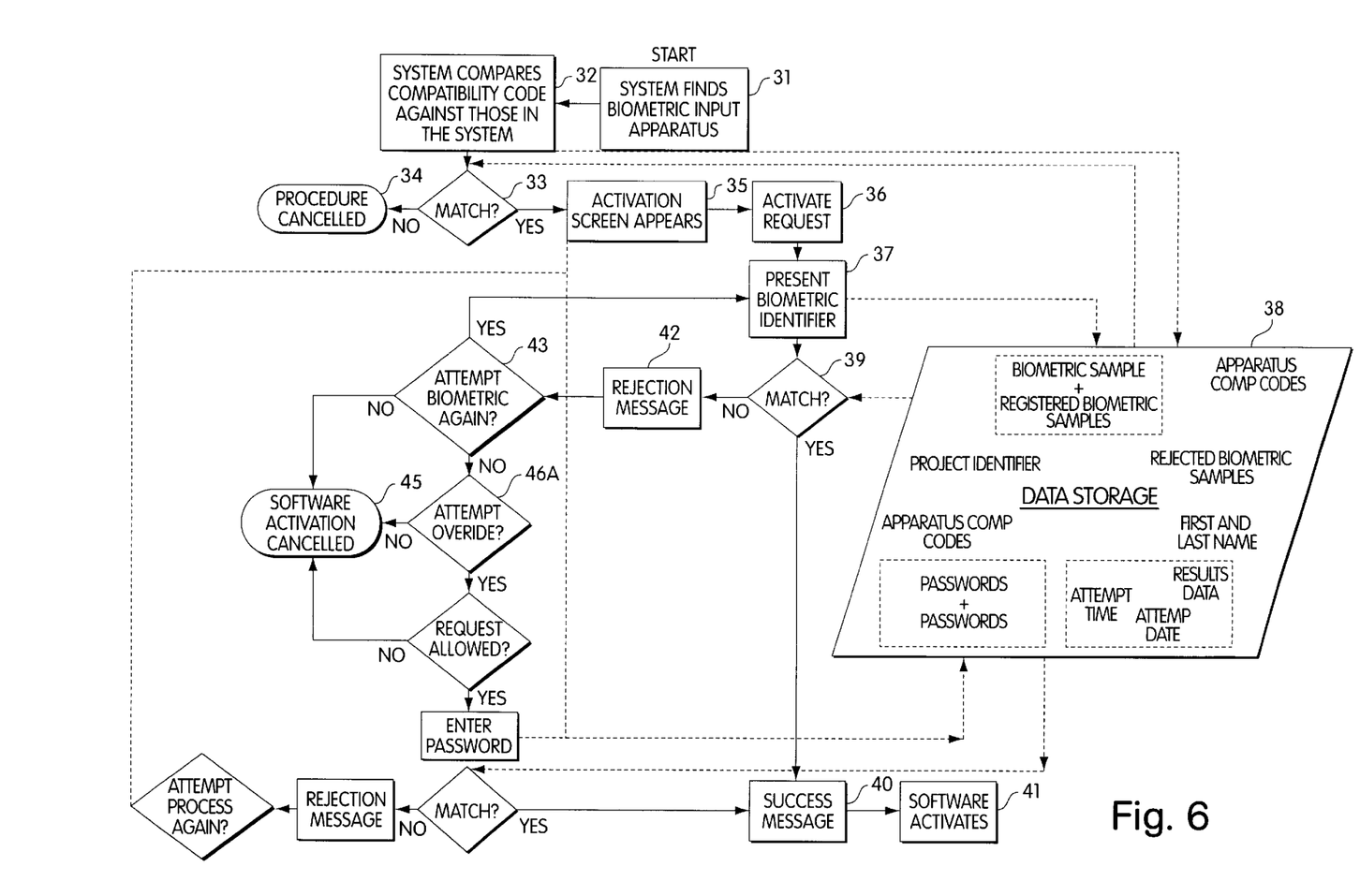
FIG. 6 is a flow chart representing a successful first attempt of a customer activation process for an embodiment of the invention in a non-networking environment.

The customer activation process in an illustrative non-network environment is described in FIG. 6. The system goes through the apparatus compatibility matching process (see FIG. 3, 1a–1d). An activation request is initiated 36 and the registered biometric is presented 37. The biometric is transmitted and compared against those stored 38. If a match is found 39, a system-configurable success message appears 40, and the software activates 41. If there is no match 39, a system-configurable rejection message appears 42. The customer can choose to attempt the biometric process again 43, attempt to override the system 46A or cancel the process 45 (refer to FIG. 8 for multiple attempt details). If additional attempts are made, the process continues as before until there is a successful match 40, or the process is cancelled 45.

Figure 7:
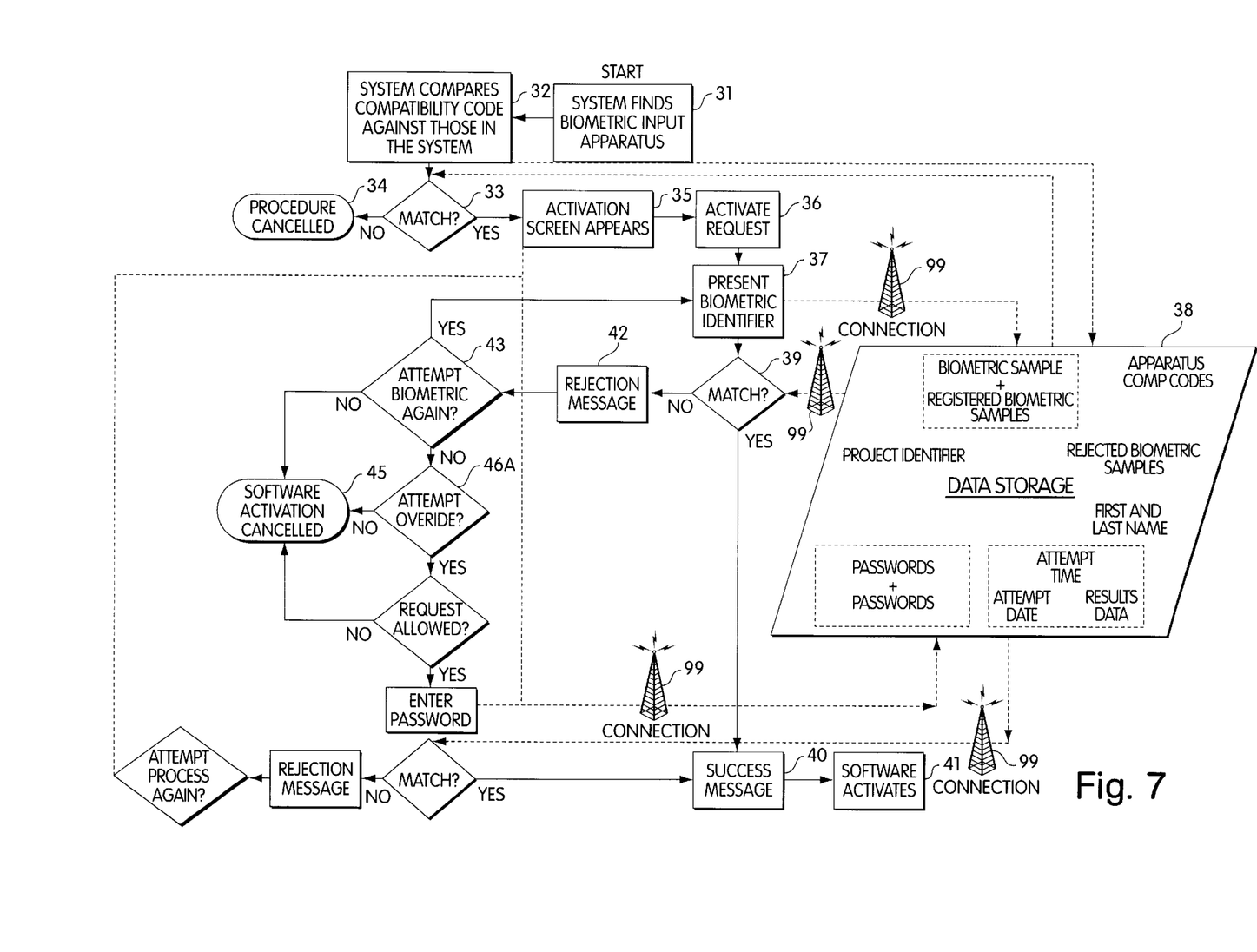
FIG. 7 is a flow chart representing a successful first attempt of a customer activation process for an embodiment of the invention in a networking environment.

The customer activation process in an illustrative network environment is described in FIG. 7. All steps are the same as in FIG. 6, but the communication links differ as presented in connection with element 99 of FIG. 4.

Figure 8:
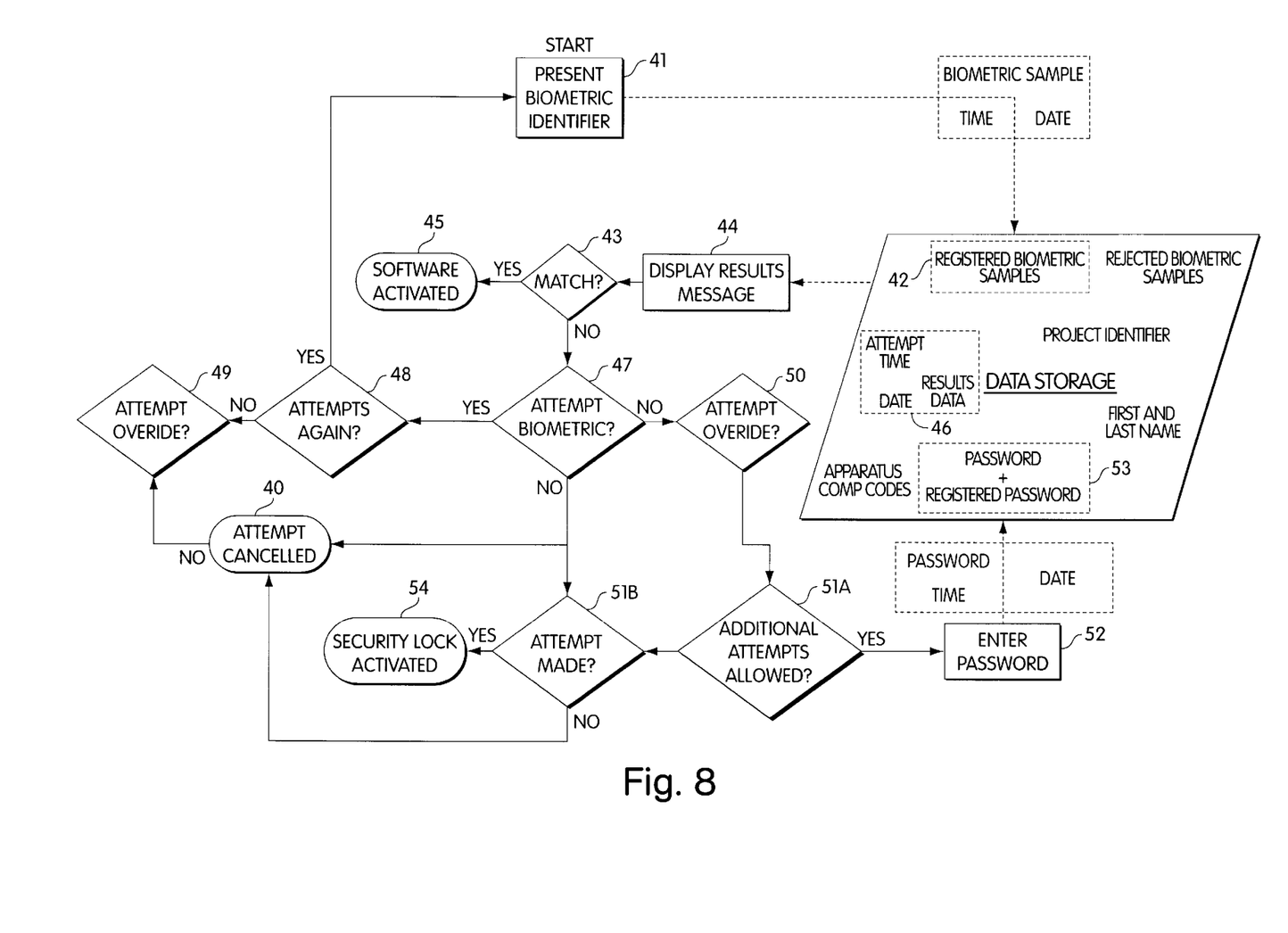
FIG. 8 is a flow chart of a customer activation process detailing multiple biometric and bypass attempts for an embodiment of the invention.

FIG. 8 details multiple attempts in an illustrative customer activation process. The details of this process are the same for a network and non-network environment. The system goes through the apparatus compatibility matching process (see FIG. 3, 1a–1d), and the customer presents the previously registered biometric 41, where it is compared against the sample previously stored during the registration process 42. The results are displayed 44, and if the system identifies a match 43 the software is activated for use 45. Additional information, such as the date and time of the activation attempt, and the results, are stored in the system for all attempts (including multiple biometric and bypass attempts)

46. If a match is not found 43, the system allows for the customer to attempt the biometric process again 47. If the customer chooses to attempt again 48, the process begins again 41. If the customer does not choose to make another attempt, then the customer may choose to attempt an override of the system 50, or cancel the process 40.

If a biometric is unable to be presented, or the biometric capturing mechanism is not functioning properly, the system allows for an attempt to override of the biometric verification process 50. Like the secondary biometric attempt process, the system limits the number of allowable bypass attempts. If a bypass attempt is allowed 51A, the customer enters his/her password 52. The system then compares it against the password previously registered 53. If the system identifies a match 43, the software is activated for use 45. If the system does not allow for additional bypass attempts, then the process is cancelled. If additional attempts are made 51B, the system will activate a security lockout feature 54. The lock will not be released without presentation and matching of a previously registered biometric (see FIGS. 6 and 7). If the customer is unable to present his/her biometric, he or she will need to re-register (see FIG. 9).

Figure 9:
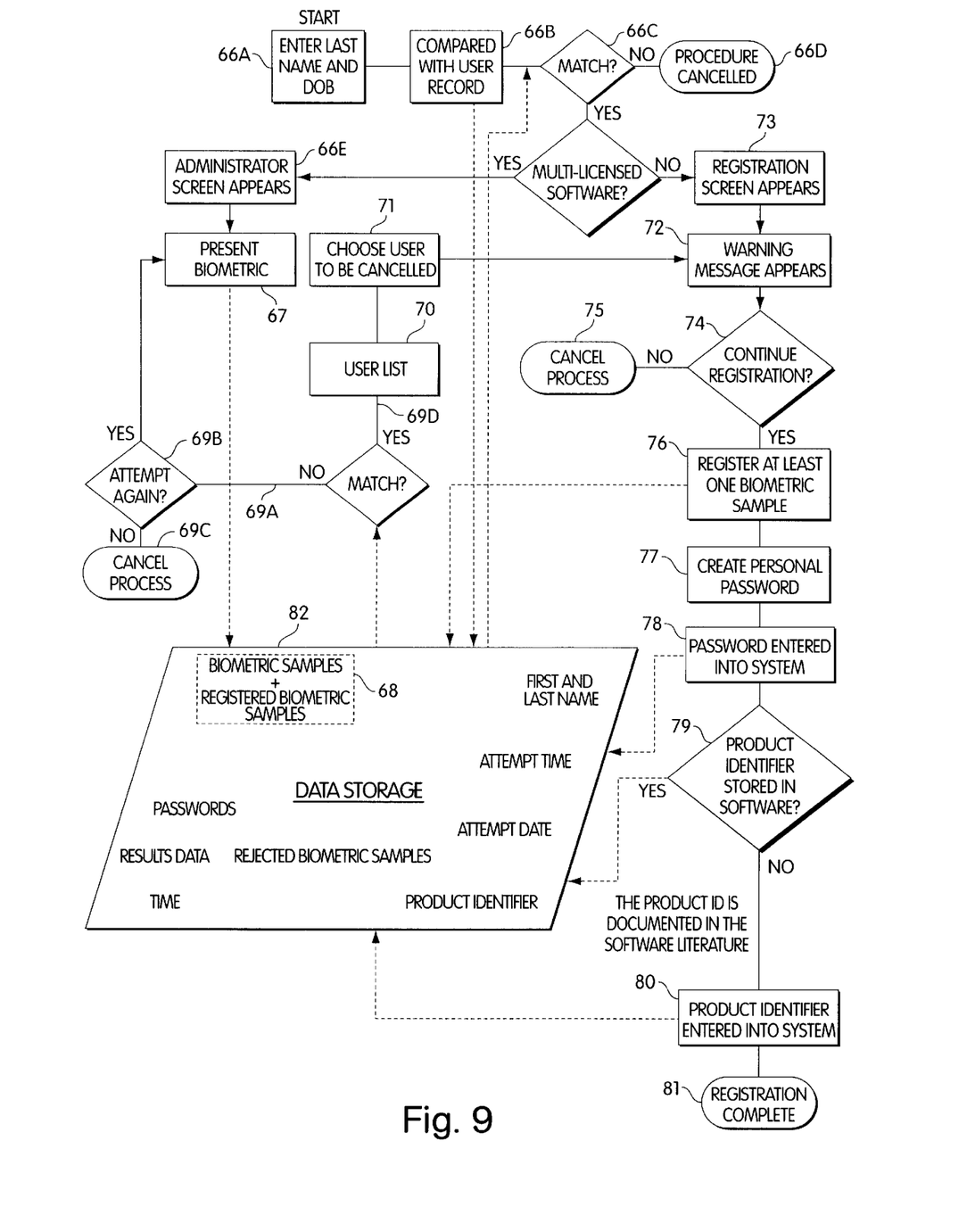
FIG. 9 is a flow chart of a re-registration process for an embodiment of the invention.

FIG. 9 details the re-registration process in an illustrative embodiment. The system goes through the apparatus compatibility matching process (see FIG. 3, 1a–1d). The customer's last name and date of birth must be presented to allow for re-registration to proceed 66a. The date of birth is compared with the one in the system 66b and if it finds a match 66c, the process may continue. If it does not find a match 66d, the process may not proceed. If the software is a multi-license package, an administrator screen appears 66e. In a multi-customer license package, an administrator is chosen from one of the licensed customers during the registration process. The administrator presents his or her biometric sample 67 for comparison 68. If a match is not received, 69a the customer may choose to attempt the process again 69b or cancel the process 69c. If a match is received 69d, the administrator is presented with a list of names of customers registered for software use 70. The administrator chooses the customer to be canceled 71, accepts the warning message 72, and the customer record is cancelled. If he or she chooses not to cancel the record, the process itself is cancelled. To re-register on a single customer software license 73, the warning message appears prior to cancellation of the customer record 72. The administrator accepts the message and the previous registered record is cancelled. If he or she chooses not to cancel the record 74, the process itself is cancelled 75. The registration process continues for both multi- and single-customer software by requesting a customer to present at least one biometric, such as a fingerprint, for registration with the system 76. In addition to presenting the biometric, the customer documents the biometric type (e.g., finger as opposed to eye) as well as the biometrics geography (e.g., index finger of right hand). This becomes part of the customer record. The system stores this biometric record 82 and requests the customer to create 77 and enter 78 a password, which is also stored in the system 82. A product identifier is stored in the system either by the identifier having already been embedded in the software 79, or by the customer manually 80 entering it. In an error-free process, this information is stored 82 and registration would then be complete 81.

The customer re-registration process in a network environment is the same as in FIG. 9 however the communication links differ as presented in connection with element 99 of FIG. 4.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A software distribution method, comprising:
   offering software to a customer,
   presenting a selection of payment choices including at least one choice involving access based on biometric identification and at least one choice involving access without biometric identification,
   storing biometric identification information received from the customer in a customer storage area,
   receiving a biometric identification signal in response to customer interaction with a biometric interface,
   detecting a match between the biometric identification signal and the identification information stored in the customer storage area by the step of storing,
   permitting the customer to use the software in response to the step of detecting a match and after the step of offering, and
   receiving a payment commitment from the customer before the step of permitting the customer to use the software, wherein the step of receiving a payment commitment is performed after the step of presenting the selection.

2. The method of claim 1 wherein the biometric identification information is received electronically through a public network.

3. The method of claim 1 wherein the biometric identification information is stored in a portable machine-readable storage element.

4. The method of claim 3 wherein the biometric identification information is stored in a portable machine-readable storage element having a size on the order of a credit-card or smaller.

5. The method of claim 1 further including the step of conveying a copy of the software to the customer.

6. The method of claim 1 further including the steps of detecting a mismatch between the biometric identification signal and the identification information stored in the customer storage area by the step of storing, and permitting the customer to use the software a limited number of times in response to the step of detecting a mismatch and after the step of offering.

7. The method of claim 1 further including the steps of:
   storing replacement biometric identification information received from the customer in a customer storage area,
   receiving a biometric identification signal in response to customer interaction with a biometric interface,
   detecting a match between the biometric identification signal and the replacement identification information stored in the customer storage area by the step of storing, and
   permitting the customer to use the software in response to the step of detecting a match between the biometric identification signal and the replacement identification information.

8. The method of claim 7 further including a step of registering a biometric interface to validate the biometric identification signal received in the step of receiving.

9. The method of claim 1 wherein the step of storing stores the biometric identification information received from the customer in one of a plurality of customer storage entries in a centralized customer database.

10. The method of claim 1 wherein the step of offering offers software for playing audio recordings.

11. The method of claim 1 wherein the step of offering offers software for playing video recordings.

12. A software distribution method, comprising:
    offering software to a customer,
    storing biometric identification information received from the customer in a customer storage area,
    receiving a biometric identification signal in response to customer interaction with a biometric interface,
    detecting a match between the biometric identification signal and the identification information stored in the customer storage area by the step of storing,
    permitting the customer to use the software in response to the step of detecting a match and after the step of offering, and
    further including the step of recording the software in a proprietary format and conveying to the customer a proprietary player capable of reading the proprietary format.

13. The method of claim 12 further including the steps of detecting a mismatch between the biometric identification signal and the identification information stored in the customer storage area by the step of storing, and permitting the customer to use the software a limited number of times in response to the step of detecting a mismatch and after the step of offering.

14. The method of claim 13 wherein the step of permitting the customer to use the software a limited number of times requires a password from the customer.

15. The method of claim 12 further including the steps of:
    storing replacement biometric identification information received from the customer in a customer storage area,
    receiving a biometric identification signal in response to customer interaction with a biometric interface,
    detecting a match between the biometric identification signal and the replacement identification information stored in the customer storage area by the step of storing, and
    permitting the customer to use the software in response to the step of detecting a match between the biometric identification signal and the replacement identification information.

16. The method of claim 12 further including a step of registering a biometric interface to validate the biometric identification signal received in the step of receiving.

17. The method of claim 12 wherein the step of storing stores the biometric identification information received from the customer in one of a plurality of customer storage entries in a centralized customer database.

18. The method of claim 12 wherein the step of offering offers software for playing audio recordings.

19. The method of claim 12 wherein the step of offering offers software for playing video recordings.

20. The method of claim 12 further including the step of receiving a payment commitment from the customer before the step of permitting the customer to use the software.

21. The method of claim 12 wherein the biometric identification information is received electronically through a public network.

22. The method of claim 12 wherein the biometric identification information is stored in a portable machine-readable storage element.

23. The method of claim 22 wherein the biometric identification information is stored in a portable machine-readable storage element having a size on the order of a credit-card or smaller.

24. The method of claim 12 further including the step of conveying a copy of the software to the customer.

25. A licensed software use validation method, comprising:
    presenting a biometric interface to a customer,
    receiving a biometric identification signal in response to customer interaction with the biometric interface,
    detecting a match between the biometric identification signal and an entry in a customer storage area, which entry indicates that the customer is registered to access the software, and
    permitting the customer to use the software in response to the step of detecting a match, wherein the steps of presenting, receiving, detecting, and permitting are performed by a player and wherein the steps of presenting, receiving, detecting, and permitting take place after the player and rights in the software have been conveyed to the customer.

26. The method of claim 25 further including the step of receiving a payment commitment from the customer before the step of permitting the customer to use the software.

27. The method of claim 25 wherein the biometric identification information is stored in a portable machine-readable storage element.

28. The method of claim 27 wherein the biometric identification information is stored in a portable machine-readable storage element having a size on the order of a credit-card or smaller.

29. The method of claim 25 further including the step of conveying a copy of the software to the customer.

30. The method of claim 25 further including the steps of detecting a mismatch between the biometric identification signal and the identification information stored in the customer storage area by the step of storing, and permitting the customer to use the software a limited number of times in response to the step of detecting a mismatch and after the step of offering.

31. The method of claim 25 further including the steps of:
    storing replacement biometric identification information received from the customer in a customer storage area,
    receiving a biometric identification signal in response to customer interaction with a biometric interface,
    detecting a match between the biometric identification signal and the replacement identification information stored in the customer storage area by the step of storing, and
    permitting the customer to use the software in response to the step of detecting a match between the biometric identification signal and the replacement identification information.

32. The method of claim 25 further including a step of registering a biometric interface to validate the biometric identification signal received in the step of receiving.

33. The method of claim 25 wherein the step of storing stores the biometric identification information received from the customer in one of a plurality of customer storage entries in a centralized customer database.

34. The method of claim 25 wherein the step of permitting permits the user to use software for playing audio recordings.

35. The method of claim 25 wherein the step of permitting permits the user to use software for playing video recordings.

36. The method of claim 25 wherein the steps of presenting, receiving, detecting, and permitting are all performed in a single housing of a player assembly.

37. The method of claim 36 wherein the steps of presenting, receiving, detecting, and permitting are all performed by a player assembly that weighs less than three pounds.

38. The method of claim 25 wherein the step of presenting a biometric interface presents a fingerprint detector.

39. A software distribution system, comprising:

means for offering software to a customer, means for presenting a selection of payment choices including at least one choice involving access based on biometric identification and at least one choice involving access without biometric identification, means for storing biometric identification information received from the customer in a customer storage area, means for receiving a biometric identification signal in response to customer interaction with a biometric interface, means for detecting a match between the biometric identification signal and the identification information stored in the customer storage area by the means for storing, means for permitting the customer to use the software in response to the means for detecting a match and after a step of offering by the means for offering, and means for receiving a payment commitment from the customer before the means for permitting permits the customer to use the software, wherein the means for receiving a payment commitment is operative to receive a payment commitment after a step of presenting a selection by the means for presenting a selection.

40. The apparatus of claim 39 further including means for registering a biometric interface to validate the biometric identification signal received by the means for receiving.

41. The apparatus of claim 39 wherein the means for offering is operative to offer software for playing audio recordings.

42. The apparatus of claim 39 wherein the means for offering is operative to offer software for playing video recordings.

43. The apparatus of claim 39 wherein the means for storing biometric identification information is responsive to a fingerprint detector.

44. A software distribution system, comprising:

means for offering software to a customer, means for storing biometric identification information received from the customer in a customer storage area, means for receiving a biometric identification signal in response to customer interaction with a biometric interface, means for detecting a match between the biometric identification signal and the identification information stored in the customer storage area by the means for storing, means for permitting the customer to use the software in response to the means for detecting a match and after a step of offering by the means for offering, and means for recording the software in a proprietary format and conveying to the customer a proprietary player capable of reading the proprietary format.

45. The apparatus of claim 44 further including means for registering a biometric interface to validate the biometric identification signal received by the means for receiving.

46. The apparatus of claim 44 wherein the means for offering is operative to offer software for playing audio recordings.

47. The apparatus of claim 44 wherein the means for offering is operative to offer software for playing video recordings.

48. The apparatus of claim 44 wherein the means for storing biometric identification information is responsive to a fingerprint detector.

49. A software distribution system, comprising:

means for presenting a biometric interface to a customer, means for receiving a biometric identification signal in response to customer interaction with the biometric interface, means for detecting a match between the biometric identification signal and an entry in a customer storage area, which entry indicates that the customer is registered to access the software, and means for permitting the customer to use the software in response to the means for detecting a match, wherein the means for presenting, receiving, detecting, and permitting are part of a player and wherein the means for presenting, receiving, detecting, and permitting are operative to perform steps of presenting, receiving, detecting, and permitting that take place after the player and rights in the software have been conveyed to the customer.

50. The apparatus of claim 49 further including means for registering a biometric interface to validate the biometric identification signal received by the means for receiving.

51. The apparatus of claim 49 wherein the means for offering is operative to offer software for playing audio recordings.

52. The apparatus of claim 49 wherein the means for offering is operative to offer software for playing video recordings.

53. The apparatus of claim 49 wherein means for presenting, receiving, detecting, and permitting are all housed in a single housing.

54. The apparatus of claim 53 wherein the player assembly weighs less than three pounds.

55. The apparatus of claim 49 wherein the means for presenting a biometric interface presents a fingerprint detector.

56. The apparatus of claim 49 wherein the player assembly is an audio recording player assembly.

* * * * *

UNITED STATES PATENT AND TRADEMARK OFFICE
CERTIFICATE OF CORRECTION

PATENT NO.     : 6,615,191 B1
DATED          : September 2, 2003
INVENTOR(S)    : E. Addison Seeley It is certified that error appears in the above-identified patent and that said Letters Patent is hereby corrected as shown below:

<u>Column 12,</u>
Line 65, "claim 7" should read -- claim 1 --.

Signed and Sealed this

Twenty-third Day of December, 2003

JAMES E. ROGAN
*Director of the United States Patent and Trademark Office*